(12) United States Patent
Fujishima et al.

(10) Patent No.: US 12,024,848 B2
(45) Date of Patent: Jul. 2, 2024

(54) CONSTRUCTION MACHINE

(71) Applicant: Hitachi Construction Machinery Co., Ltd., Tokyo (JP)

(72) Inventors: Hiroaki Fujishima, Tsuchiura (JP); Shouhei Kamiya, Ryugasaki (JP); Tomoyuki Saitou, Kashiwa (JP); Tadashi Nakano, Tsuchiura (JP); Naoki Yokemura, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 560 days.

(21) Appl. No.: 17/273,597

(22) PCT Filed: Jan. 22, 2020

(86) PCT No.: PCT/JP2020/002103
§ 371 (c)(1),
(2) Date: Mar. 4, 2021

(87) PCT Pub. No.: WO2020/153398
PCT Pub. Date: Jul. 30, 2020

(65) Prior Publication Data
US 2022/0112679 A1 Apr. 14, 2022

(30) Foreign Application Priority Data
Jan. 25, 2019 (JP) ................................ 2019-011103

(51) Int. Cl.
*E02F 3/32* (2006.01)
*E02F 9/08* (2006.01)

(52) U.S. Cl.
CPC ............ *E02F 3/325* (2013.01); *E02F 9/0883* (2013.01)

(58) Field of Classification Search
CPC . E02F 3/325; E02F 9/18; E02F 9/0866; E02F 9/0808; E02F 3/32; B60K 15/063; B60K 15/03
See application file for complete search history.

(56) References Cited

U.S. PATENT DOCUMENTS 9,027,697 B2 * 5/2015 Kobayashi ............ E02F 9/0891
180/309
9,227,510 B2 * 1/2016 Sasaki .................. B60K 15/067
(Continued)

FOREIGN PATENT DOCUMENTS

CN 103703190 A 4/2014
EP 2 826 921 A1 1/2015
(Continued)

OTHER PUBLICATIONS

International Search Report (PCT/ISA/210) issued in PCT Application No. PCT/JP2020/002103 dated Mar. 17, 2020 with English translation (four (4) pages).
(Continued)

Primary Examiner — Jamie L McGowan
Assistant Examiner — Audrey L Lusk
(74) Attorney, Agent, or Firm — Crowell & Moring LLP

(57) ABSTRACT

A hydraulic oil tank (17) is supported by a tank support base (18) and a tank support base (19) at a position higher than that of an upper surface (8A) of a right side frame (8) . Also, a space portion (23) with an opening (23A) corresponding to an outer side in the right-and-left direction of an upper revolving structure (3) is provided between a hydraulic oil tank attachment site (9B) and a hydraulic oil tank attachment site (10B), and a bottom surface portion (17E) of the hydraulic oil tank (17). In addition, the opening (23A) of the space portion (23) is provided with an opening/closing cover (25D) openably closing the opening (23A).

3 Claims, 8 Drawing Sheets

(56) References Cited

U.S. PATENT DOCUMENTS

| | | | |
|---|---|---|---|
| 9,366,007 B2 * | 6/2016 | Azuma | E02F 9/0833 |
| 9,677,248 B2 * | 6/2017 | Nakano | E02F 9/0883 |
| 2010/0206927 A1 * | 8/2010 | Noda | E02F 9/0891 |
| | | | 224/401 |
| 2013/0341481 A1 | 12/2013 | Sasaki | |
| 2014/0000726 A1 | 1/2014 | Kawamoto et al. | |
| 2014/0017054 A1 | 1/2014 | Motozu et al. | |
| 2016/0138242 A1 * | 5/2016 | Hwang | E02F 9/18 |
| | | | 180/69.4 |
| 2018/0044886 A1 * | 2/2018 | Namai | E02F 9/0833 |

FOREIGN PATENT DOCUMENTS

| | | | | |
|---|---|---|---|---|
| JP | 2591064 Y2 | | 2/1999 | |
| JP | 2002-61224 A | | 2/2002 | |
| JP | 2002061224 A | * | 2/2002 | E02F 9/0883 |
| JP | 2010-209521 A | | 9/2010 | |
| JP | 2011-42994 A | | 3/2011 | |
| JP | 2012-193566 A | | 10/2012 | |
| JP | 2017-166142 A | | 9/2017 | |
| KR | 10-2018-0104901 A | | 9/2018 | |

OTHER PUBLICATIONS

Japanese-language Written Opinion (PCT/ISA/237) issued in PCT Application No. PCT/JP2020/002103 dated Mar. 17, 2020 (three (3) pages).

Chinese-language Office Action issued in Chinese Application No. 2020080004919.1 dated Jan. 13, 2022 (seven (7) pages).

Korean-language Office Action issued in Korean Application No. 10-2021-7006716 dated Aug. 18, 2022 with English translation (10 pages).

Extended European Search Report issued in European Application No. 20745809.2 dated Mar. 9, 2022 (seven (7) pages).

\* cited by examiner

CONSTRUCTION MACHINE

TECHNICAL FIELD

The present disclosure relates to a construction machine such as a hydraulic excavator with an oil reservoir tank provided on a vehicle body frame, for example.

BACKGROUND ART

Ahydraulic excavator is generally configured, as a construction machine, by a lower traveling structure that is self-propelled in a front-and-rear direction, an upper revolving structure mounted rotatably on the lower traveling structure, and a front device provided capable of moving upward/downward on the upper revolving structure.

The upper revolving structure includes a revolving frame composed of a base. The revolving frame is located on one side in the right-and-left direction and provided with a tank attachment site. The tank attachment site is provided with an oil reservoir tank storing oil liquids, for example, a fuel tank and an operation oil tank (Patent Document 1).

PRIOR ART DOCUMENT

Patent Document

Patent Document 1: Japanese Patent Laid-Open No. 2011-042994 A

SUMMARY OF THE INVENTION

Herein, the inside of a fuel tank is subjected to foreign objects from inferior fuels used and moisture due to dew condensation or oil supply operations in rainy weather. Waste liquids, composed of these foreign objects and moisture, can rust the fuel tank, and deteriorate the engine performance. As a result, fuel tanks need regular maintenance operation of removing such waste liquids.

Since waste liquids in the fuel tank are of a higher specific gravity than fuels and can thus deposit at a bottom surface portion of the fuel tank, an outlet port discharging waste liquids is provided at a bottom surface portion of the fuel tank. The fuel tank is also mounted on a revolving frame, which inevitably requires the outlet port to be opened and closed from a lower surface side of the revolving frame. Accordingly, an operator is required to crawl under a lower side of the revolving frame or hold a pan receiving waste liquids with one hand to visually confirm the outlet port, which unfortunately causes low operational efficiencies.

In addition, waste liquids such as various types of wear debris generated by sliding, degraded hydraulic oil, and moisture caused by dew condensation deposit even at a bottom surface portion of a hydraulic oil tank while hydraulic oil circulates. As a result, hydraulic oil tanks unfortunately need regular maintenance operation of removing waste liquids, as well as fuel tanks.

Moreover, hydraulic excavators include known small revolving machines, i.e., downsized upper revolving structures formed in a compact size capable of revolving even in a narrow working site. In such small turn-type hydraulic excavators, a limited installation space on a revolving frame fails to secure a space accommodating tools or the like.

One embodiment of the present invention has an object to provide a construction machine that can advantageously improve the maintenance operational efficiency of an oil reservoir tank, and secure a space accommodating tools and the like.

One embodiment of the present invention is to provide a construction machine including: a vehicle body; a vehicle body frame including a center frame disposed in the center in the right-and-left direction of the vehicle body, a left side frame provided on the left side of the center frame and extending in a front-and-rear direction of the vehicle body, and a right side frame provided on the right side of the center frame and extending in the front-and-rear direction of the vehicle body; a tank attachment site located and provided on one side in the right-and-left direction of the vehicle body frame; and an oil reservoir tank storing oil liquids provided at the tank attachment site, in which the tank attachment site is provided with a tank support base supporting the oil reservoir tank at a position at which a bottom surface portion of the oil reservoir tank is separated upward fromthe tank attachment site, the oil reservoir tank is supported by the tank support base at a position higher than that of an upper surface of either the left side frame or the right side frame, a space portion with an opening corresponding to an outer side in the right-and-left direction of the vehicle body opposite to the center frame is provided between the tank attachment site and the bottom surface portion of the oil reservoir tank, and the opening of the space portion is provided with an opening/closing cover openably closing the opening.

One embodiment of the present invention can advantageously improve the operational efficiency of maintenance for oil reservoir tanks, and secure a space accommodating tools and the like.

BRIEF DESCRIPTION OF THE DRAWINGS

FIG. 4 is a front view of a revolving frame, a hydraulic oil tank, a tank support base, a space portion, a tool receiver, a fuel tank and the like.

FIG. 6 is a perspective view of the revolving frame, the hydraulic oil tank, the tank support base, the space portion, the tool receiver, the fuel tank and the like.

MODE FOR CARRYING OUT THE INVENTION

An ultra short rear tail swing radius type hydraulic excavator, as an exemplary construction machine according to an embodiment of the present invention, will be described in detail with reference to FIGS. 1 to 8.

Figure 1:
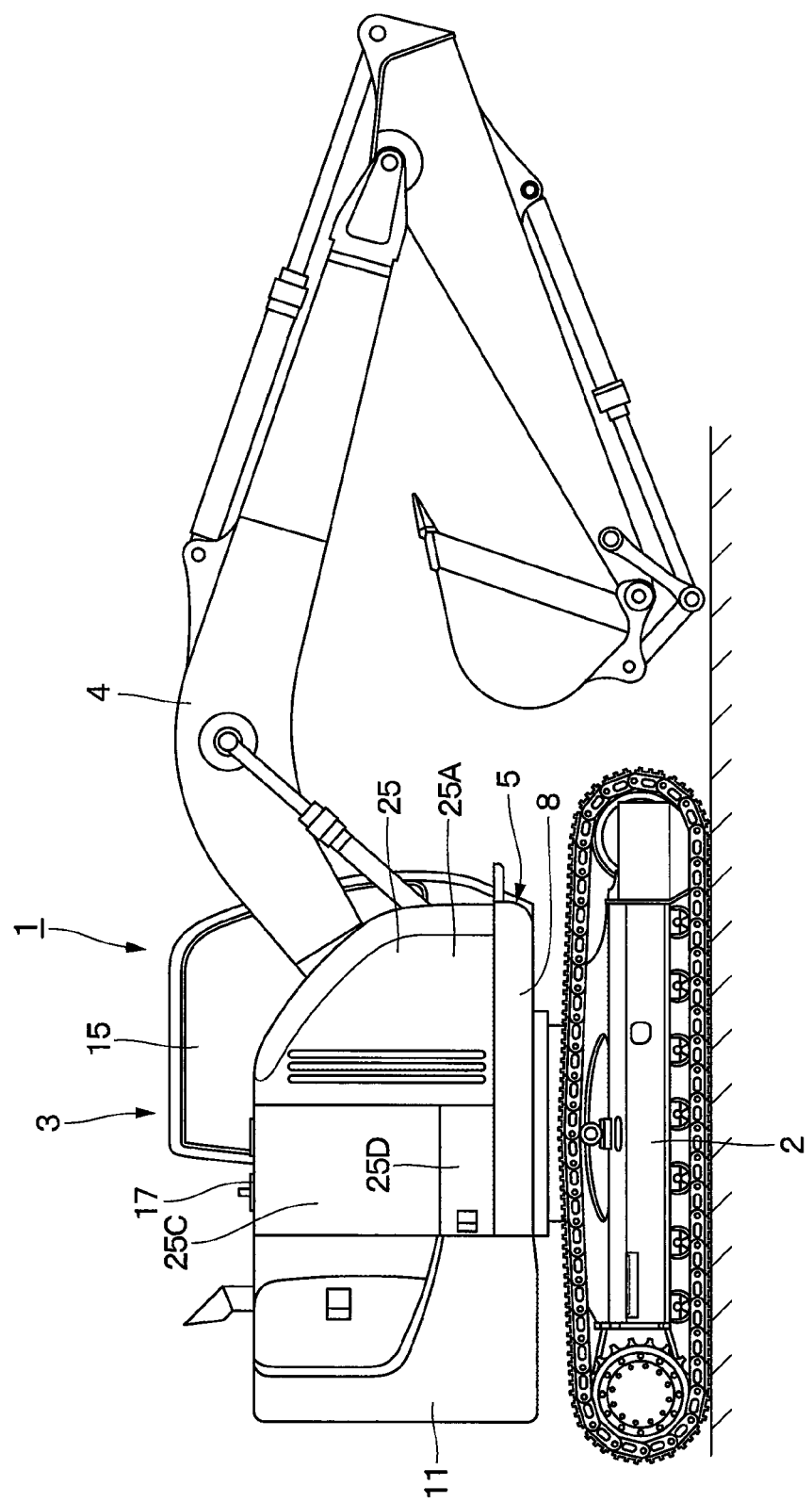
FIG. 1 is a front view of a hydraulic excavator according to one embodiment of the present invention.

In FIG. 1, a hydraulic excavator 1 constitutes a crawler type construction machine. The hydraulic excavator 1 includes a crawler-type lower traveling structure 2 that is self-propelled in a front-and-rear direction, an upper revolving structure 3 mounted rotatably on the lower traveling structure 2 to constitute a vehicle body together with the lower traveling structure 2, and a front device 4 provided capable of moving upward/downward on the front side in a front-and-rear direction of the upper revolving structure 3 to perform excavating work of earth and sand.

The upper revolving structure 3 has a width dimension in the right-and-left direction, which is almost the same as the vehicle width of the lower traveling structure 2. In addition, the upper revolving structure 3 is disposed on the front side (close to a below-described cab 15) such that a below-described counterweight 11 approximates a revolving center O (see FIG. 3). As a result, the hydraulic excavator 1 is configured as an ultra short rear tail swing radius type hydraulic excavator that allows an outer peripheral surface of a counterweight 11 to be accommodated almost within a vehicle width of the lower traveling structure 2 when the upper revolving structure 3 revolves on the lower traveling structure 2.

Figure 3:
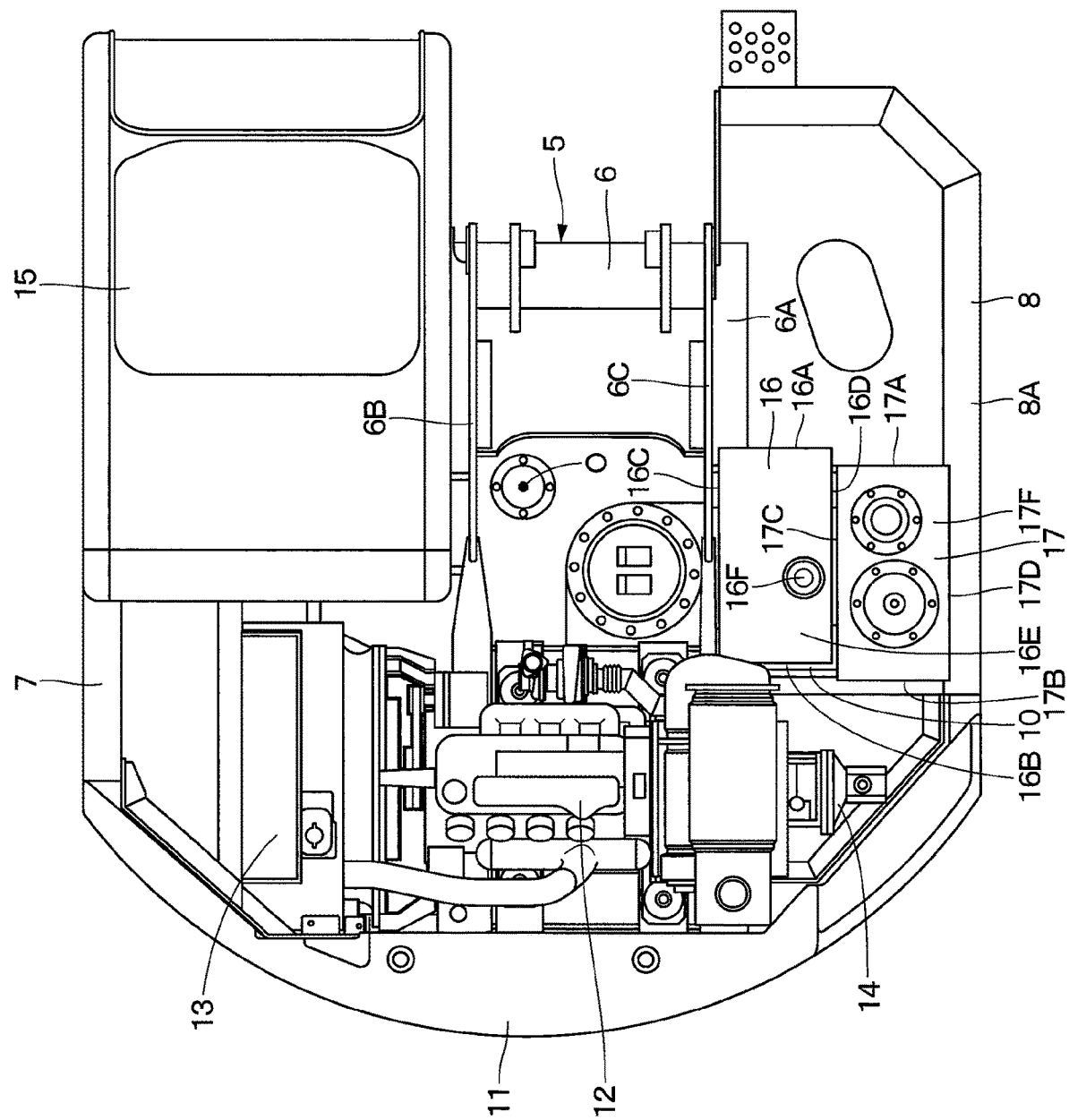
FIG. 3 is a plan view of the upper revolving structure in FIG. 2 without an exterior cover.
Figure 4:
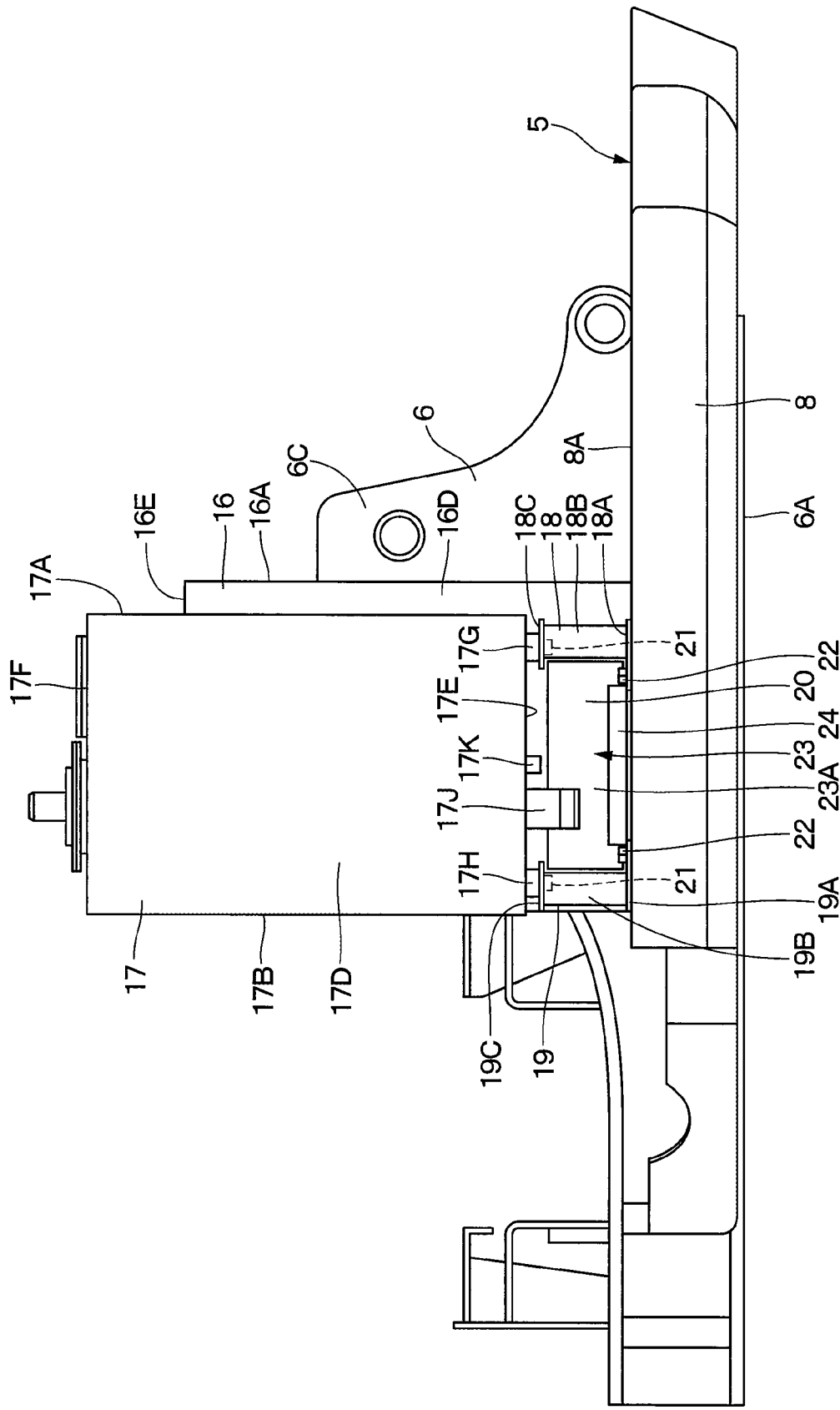

A revolving frame 5 forms a vehicle body frame that is to be a base of the upper revolving structure 3. As shown in FIG. 3, the revolving frame 5 includes a center frame 6 disposed in the center in the right-and-left direction of the upper revolving structure 3, a left side frame 7 provided on the left side of the center frame 6 and extending in a front-and-rear direction of the upper revolving structure 3, and a right side frame 8 provided on the right side of the center frame 6 and extending in the front-and-rear direction of the upper revolving structure 3.

The center frame 6 is configured by a bottom plate 6A composed of a thick steel plate extending in a front-and-rear direction and the like, and a left vertical plate 6B and a right vertical plate 6C installed upright on the bottom plate 6A and extending in a front-and-rear direction at a predetermined interval in the right-and-left direction. The front device 4 is mounted capable of moving upward/downward on a front side of the left vertical plate 6B and the right vertical plate 6C, and the counterweight 11 is mounted on a rear side thereof. The left side frame 7 is supported through a plurality of left extension beams (not shown) extending in the right-and-left direction at an interval in a front-and-rear direction from the center frame 6.

Furthermore, the right side frame 8 forms one side frame. The right side frame 8 is bent leftward at the front portion in a front-and-rear direction. The right side frame 8 is composed of a structure (D frame) whose internal cavity has a D-shaped cross section, and an upper portion thereof corresponds to a flat upper surface 8A. The right side frame 8 is supported on the right side of the center frame 6 through a below-described right front extension beam 9 and a right rear extension beam 10.

Figure 6:
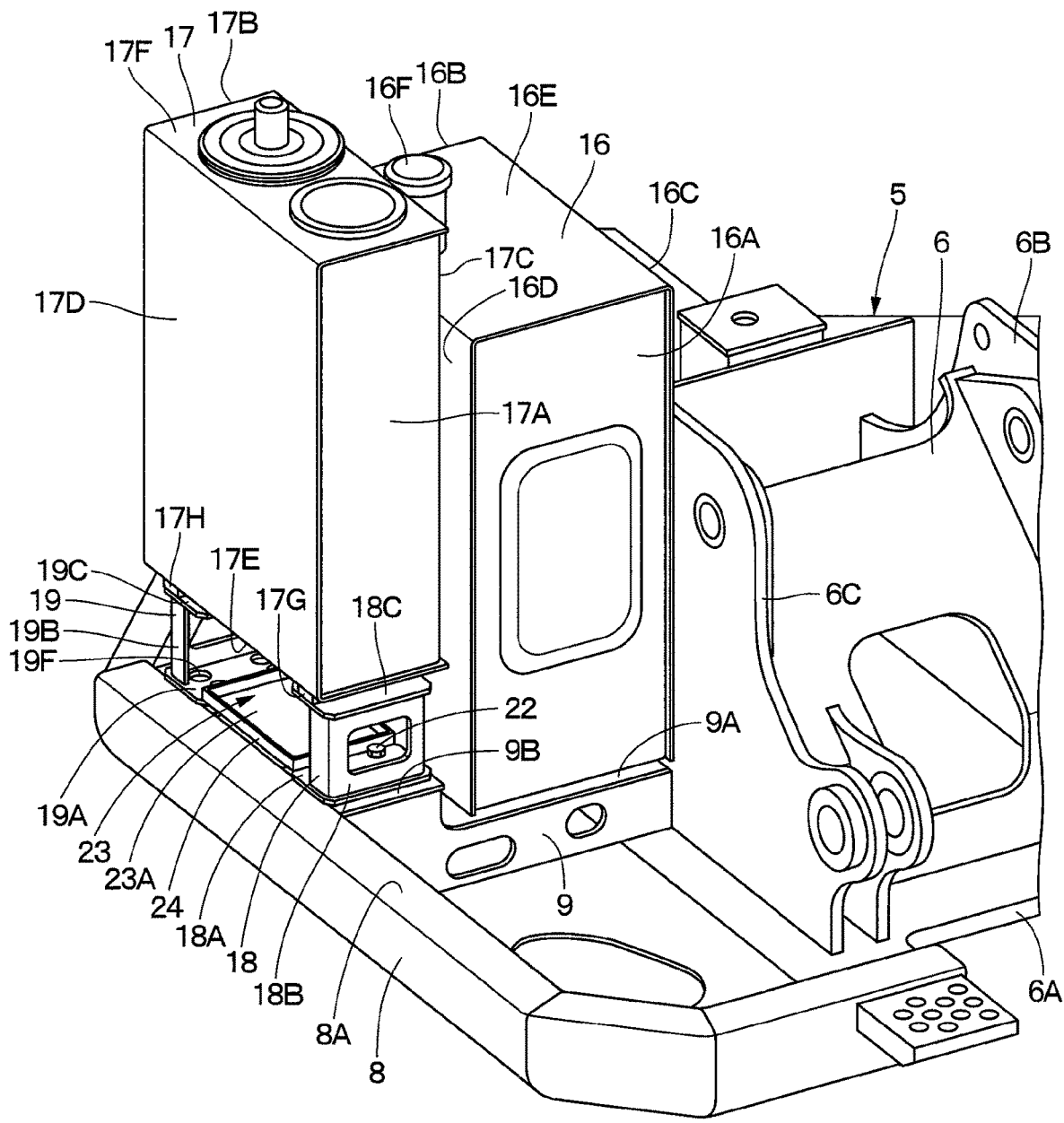
Figure 7:
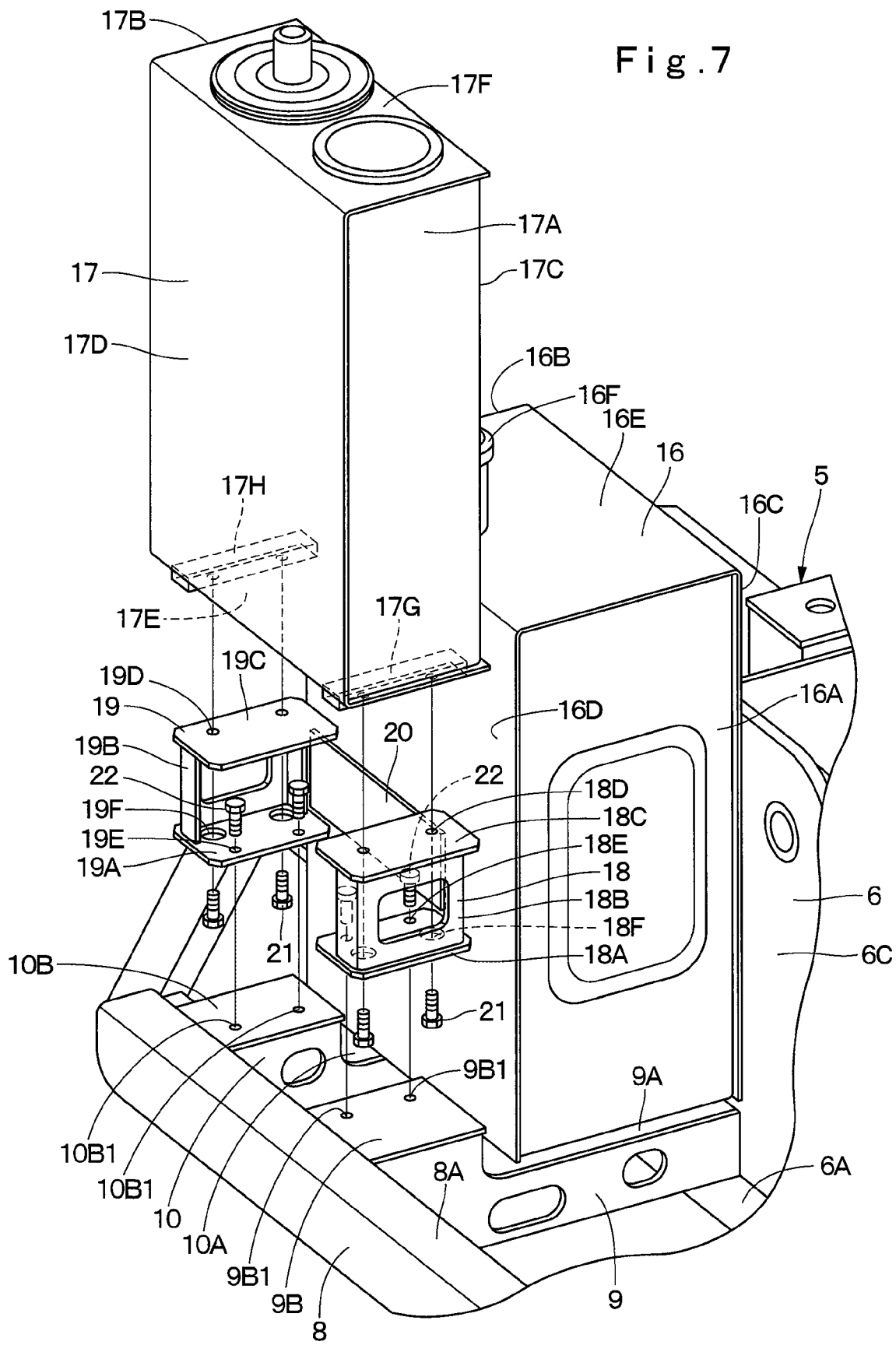
FIG. 7 is an exploded perspective view illustrating the revolving frame, each of the tank support bases and the hydraulic oil tank in FIG. 6 are disassembled.

As shown in FIGS. 6 and 7, the right front extension beam 9 and the right rear extension beam 10 support the right side frame 8 on the right side of the center frame 6. The right front extension beam 9 and the right rear extension beam 10 are disposed at an interval in a front-and-rear direction at an intermediate position in the front-and-rear direction, each extending in the right-and-left direction. The right front extension beam 9 and the right rear extension beam 10 are mounted on the left side on the center frame 6, and mounted on the right side on the right side frame 8.

In the right front extension beam 9, an upper portion on the left side from an intermediate portion in the right-and-left direction is a fuel tank attachment site 9A, and an upper portion on the right side from the intermediate portion is a hydraulic oil tank attachment site 9B as a tank attachment site. The fuel tank attachment site 9A supports a fuel tank 16, and is formed so as to have a smaller height dimension than the hydraulic oil tank attachment site 9B.

The hydraulic oil tank attachment site 9B has aheight dimension, which is larger than that of the fuel tank attachment site 9A and equivalent to that of the upper surface 8A of the right side frame 8. The hydraulic oil tank attachment site 9B supports a front side portion of a hydraulic oil tank 17 through a below-described tank support base 18 . The hydraulic oil tank attachment site 9B is provided with a plurality of, e.g., two screw holes 9B1 at an interval in the right-and-left direction. As a result, a lower mounting plate 18A of the tank support base 18 is mounted on the hydraulic oil tank attachment site 9B, using a frame side bolt 22 screwed into each of the screw holes 9B1.

In the right rear extension beam 10, an upper portion on the left side is a fuel tank attachment site 10A, and an upper portion on the right side is a hydraulic oil tank attachment site 10B as a tank attachment site, as shown in the right front extension beam 9. Also, the hydraulic oil tank attachment site 10B is provided with two screw holes 10B1 at an interval in the right-and-left direction. A lower mounting plate 19A of a tank support base 19 is mounted on the hydraulic oil tank attachment site 10B, using the frame side bolt 22 to be screwed into each of the screw holes 10B1.

Herein, the hydraulic oil tank attachment site 9B of the right front extension beam 9 and the hydraulic oil tank attachment site 10B of the right rear extension beam 10 have height dimensions equivalent to that of the upper surface 8A of the right side frame 8. As a result, a tool receiver 24 provided at the hydraulic oil tank attachment site 9B and the hydraulic oil tank attachment site 10B and tools can readily be taken in and out of a below-described space portion 23 without being hampered by the right side frame 8.

As shown in FIG. 3, the counterweight 11 is provided at a rear portion of the center frame 6 of the revolving frame 5. The counterweight 11 is formed as an arc-shaped heavy article, i.e., a center part in the right-and-left direction projecting rearward to take a weight balance with the front device 4. The counterweight 11 is disposed closer to a front side of the revolving center 0 of the revolving frame 5 so as to have a shorter revolving radius of the upper revolving structure 3.

An engine 12 is located on a front side of the counterweight 11, and transversely mounted by extending in the right-and-left direction on a rear side of the revolving frame 5. A heat exchanger 13, including a radiator, an oil cooler, and an intercooler, is disposed on the left side of the engine 12. A hydraulic pump 14 discharging hydraulic oil as pressurized oil is mounted on the right side of the engine 12.

A cab 15 is mounted on a left front side of the revolving frame 5 for an operator to get on. An operator's seat for an operator to be seated, a traveling control lever, a working control lever, and switches (each not shown) are disposed inside the cab 15.

A fuel tank 16 is provided on the right side of the revolving frame 5 to constitute an oil reservoir tank. Specifically, the fuel tank 16 is in proximity to the right side of the right vertical plate 6C of the center frame 6 to be faced therewith. The fuel tank 16 is mounted on the fuel tank attachment site 9A of the right front extension beam 9 and the fuel tank attachment site 10A of the right rear extension beam 10. The fuel tank 16 is formed as a rectangular shaped container extending in the vertical direction, including a front surface portion 16A, a rear surface portion 16B, a left surface portion 16C, a right surface portion 16D, a bottom surface portion (not shown), and a top surface portion 16E. In the fuel tank 16, the top surface portion 16E is provided with a fuel filling opening 16F filling fuels in order to store fuels to be supplied to the engine 12.

The hydraulic oil tank 17 is provided adjacent to the right side of the fuel tank 16 to constitute an oil reservoir tank. The hydraulic oil tank 17 stores hydraulic oil as oil liquids driving each of the actuators provided on the lower traveling structure 2 and the front device 4. A front side portion of the hydraulic oil tank 17 is mounted on the hydraulic oil tank attachment site 9B of the right front extension beam 9, using a below-described tank support base 18. Also, a rear side portion of the hydraulic oil tank 17 is mounted on the hydraulic oil tank attachment site 10B of the right rear extension beam 10, using the tank support base 19. In this case, the hydraulic oil tank 17 is supported by the tank support base 18 and the tank support base 19 at a position higher than that of the upper surface 8A of the right side frame 8.

Figure 5:
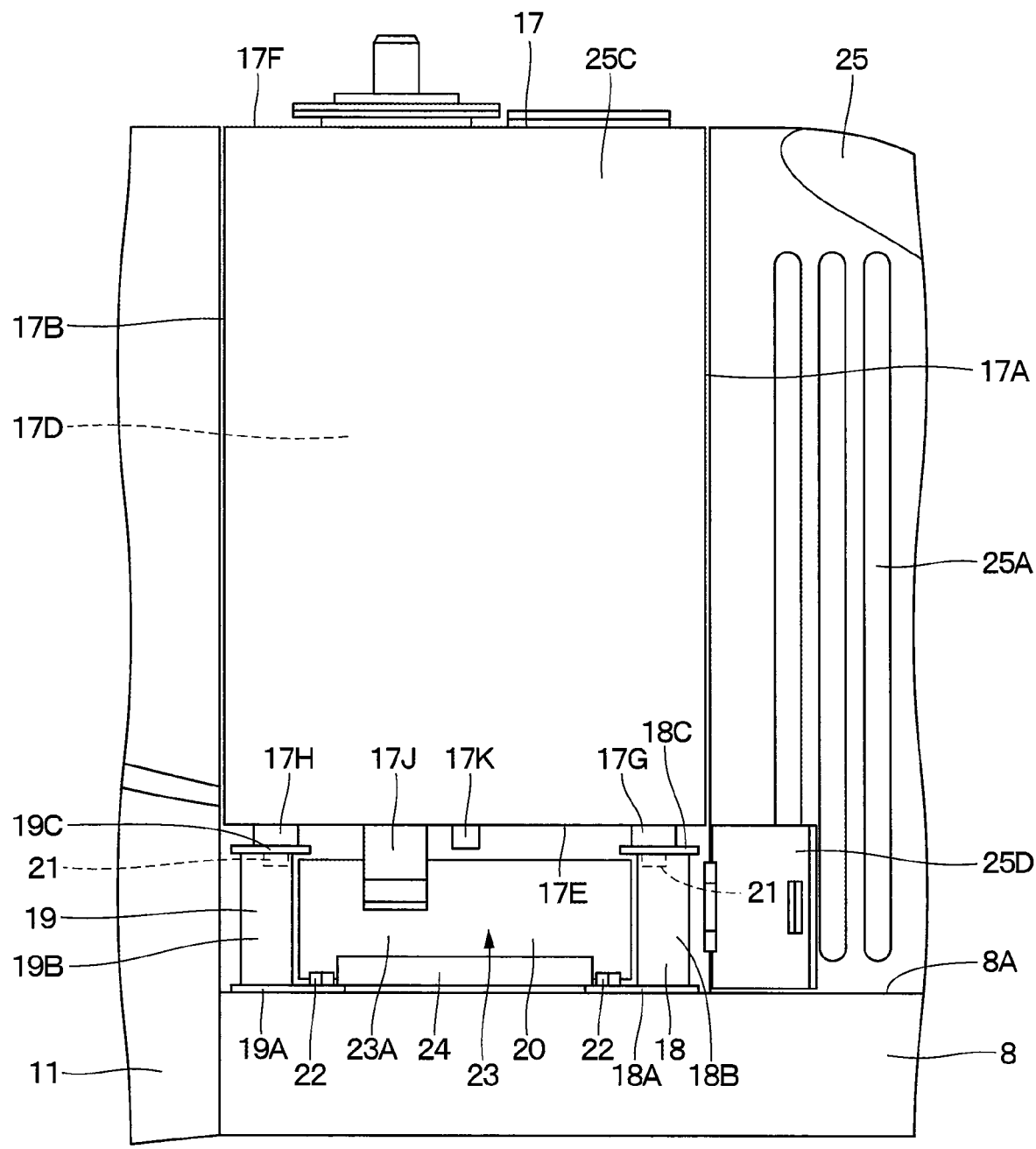
FIG. 5 is an enlarged front view of part of the upper revolving structure when an opening/closing cover is opened to open a space portion.

The hydraulic oil tank 17 is formed as a rectangular shaped container extending in the vertical direction, including a front surface portion 17A, a rear surface portion 17B, a left surface portion 17C, a right surface portion 17D, a bottom surface portion 17E, and a top surface portion 17F. The bottom surface portion 17E is provided with a front screw seat 17G and a rear screw seat 17H extending in the right-and-left direction at an interval in a front-and-rear direction. A below-described tank side bolt 21 is screwed into the front screw seat 17G and the rear screw seat 17H. Furthermore, as shown in FIG. 5, a supply pipe 17J supplying hydraulic oil is provided extending downward at the bottom surface portion 17E of the hydraulic oil tank 17.

Herein, while hydraulic oil circulates through the hydraulic pump 14, a control valve (not shown), and each of the actuators in the hydraulic oil tank 17, waste liquids including each type of wear debris generated by sliding, degraded hydraulic oil, and moisture caused by dew condensation, deposit at the bottom surface portion 17E. For this reason, the hydraulic oil tank 17 needs regular maintenance operation of removing waste liquids. Then, a discharge pipe 17K discharging waste liquids that mix and deposit in the hydraulic oil tank 17 is provided by extending downward at the bottom surface portion 17E of the hydraulic oil tank 17.

Subsequently, the configuration of the tank support base 18, the tank support base 19, and the space portion 23 that constitute the characterizing portion of an embodiment of the present invention will be described.

The tank support base 18 and the tank support base 19 support the hydraulic oil tank 17 on the revolving frame 5. As shown in FIGS. 5 and 6, the tank support base 18 located on the front side is mounted on the hydraulic oil tank attachment site 9B of the right front extension beam 9 which constitutes the revolving frame 5. Also, the tank support base 19 located on the rear side is mounted on the hydraulic oil tank attachment site 10B of the right rear extensionbeam 10 which constitutes the revolving frame 5. The tank support base 18 supports the hydraulic oil tank 17 at a position at which the bottom surface portion 17E of the hydraulic oil tank 17 is upward separated from the hydraulic oil tank attachment site 9B. Likewise, the tank support base 19 supports the hydraulic oil tank 17 at a position at which the bottom surface portion 17E of the hydraulic oil tank 17 is upward separated from the hydraulic oil tank attachment site 10B.

As a result, the tank support base 18 and the tank support base 19 support the hydraulic oil tank 17 at a position higher than that of the upper surface 8A of the right side frame 8 as one side frame. In this case, a dimension from the upper surface 8A of the right side frame 8 to the bottom surface portion 17E of the hydraulic oil tank 17 is set in the vertical direction so as to allow other pipe body (not shown) to connect to the supply pipe 17J of the hydraulic oil tank 17, the tool receiver 24 or tools to be taken in or out of the space, and drainage work using the discharge pipe 17K.

Figure 8:
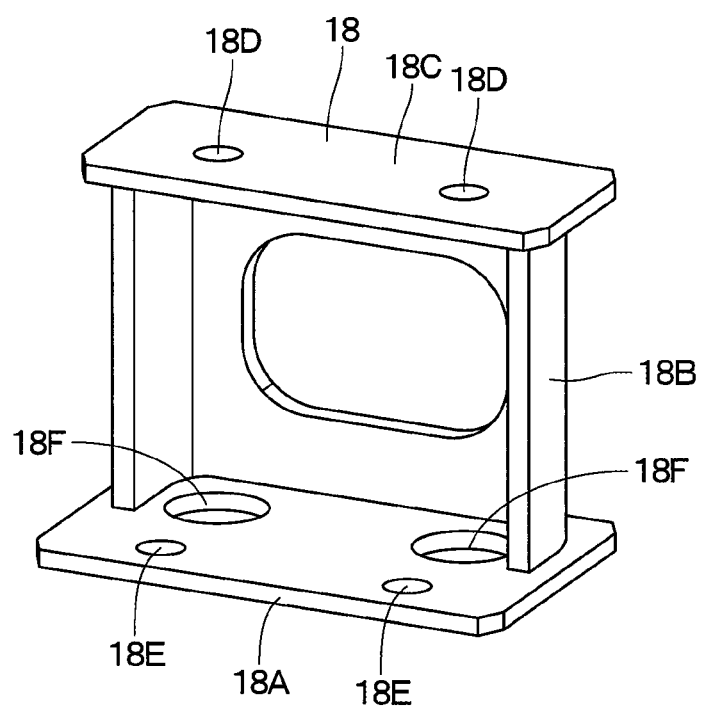
FIG. 8 is a perspective view of a single tank support base.

As shown in FIGS. 7 and 8, the tank support base 18 located on the front side includes a rectangular shaped lower mounting plate 18A extending in the right-and-left direction along the hydraulic oil tank attachment site 9B of the right front extension beam 9, a wall panel 18B extending from an edge portion side of the lower mounting plate 18A to an upper side thereof, and an upper mounting plate 18C mounted on an upper end portion of the wall panel 18B and in parallel with the lower mounting plate 18A. Two bolt through holes 18D are formed on the upper mounting plate 18C at an interval in the right-and-left direction. Also, two bolt through holes 18E are formed on the lower mounting plate 18A at positions corresponding to each of the screw holes 9B1 of the hydraulic oil tank attachment site 9B. Furthermore, a fastening opening 18F is formed on the lower mounting plate 18A so as to be positioned directly beneath each of the bolt through holes 18D of the upper mounting plate 18C.

The lower mounting plate 18A is mounted on the hydraulic oil tank attachment site 9B. Also, the upper mounting plate 18C is mounted on the front screw seat 17G of the hydraulic oil tank 17. The wall panel 18B is formed so as to make the cross section C-shaped by bending rearward both sides in the right-and-left direction. As a result, the wall panel 18B has strength high enough to support the hydraulic oil tank 17.

The tank support base 19 located on the rear side is formed so as to be symmetrical with the tank support base 18 located on the front side in a front-and-rear direction. Then, the component elements of the tank support base 19 on the rear side corresponding to those of the tank support base 18 on the front side will be simply denoted by the same reference numerals to avoid repetitions of similar explanations. That is, the tank support base 19 on the rear side includes a lower mounting plate 19A, a wall panel 19B, an upper mounting plate 19C, bolt through holes 19D, 19E, and a fastening opening 19F.

Herein, the wall panel 18B of the tank support base 18 also serves as a partition plate parting a front side of a below-described space portion 23. Meanwhile, the wall panel 19B of the tank support base 19 also serves as a partition plate parting a rear side of the below-described space portion 23. Also, a rectangular shaped depth plate 20 is provided by extending in a front-and-rear direction between the wall panel 18B of the tank support base 18 and the wall panel 19B of the tank support base 19. The depth plate 20 constitutes a partition plate parting a deepest portion (left side) of the space portion 23. Therefore, the wall panel 18B of the tank support base 18, the wall panel 19B of the tank support base 19 and the depth plate 20 constitute a partition plate surrounding the periphery of the space portion 23 other than the opening 23A. In addition, the depth plate 20 can prevent tools accommodated in a below-described tool receiver 24 from hitting the right surface portion 16D of the fuel tank 16.

One example of mounting the hydraulic oil tank 17 on the revolving frame 5 using the tank support base 18 and the tank support base 19 will be described. The upper mounting plate 18C of the tank support base 18 is allowed to abut on the front screw seat 17G of the hydraulic oil tank 17 to screw a tank side bolt 21 inserted into a bolt through hole 18D into the front screw seat 17G. Likewise, the upper mounting plate 19C of the tank support base 19 is allowed to abut on the rear screw seat 17H of the hydraulic oil tank 17 to screw the tank side bolt 21 inserted into a bolt through hole 19D into the rear screw seat 17H. As a result, the tank support base 18 and the tank support base 19 can be mounted on the hydraulic oil tank 17. When the tank side bolt 21 is fastened, fastening tools such as an impact wrench can be inserted into the fastening openings 18F, 19F. Therefore, an operator can easily fasten or loosen the tank side bolt 21 with a fastening tool.

When the tank support base 18 and the tank support base 19 are mounted on the hydraulic oil tank 17, the lower mounting plate 18A of the tank support base 18 is placed on the hydraulic oil tank attachment site 9B of the right front extension beam 9 to screw the frame side bolt 22 inserted into a bolt through hole 18E into a screw hole 9B1. Also, the lower mounting plate 19A of the tank support base 19 is placed on the hydraulic oil tank attachment site 10B of the right rear extension beam 10 to screw the frame side bolt 22 inserted into a bolt through hole 19E into a screw hole 10B1. As a result, the tank support base 18 and the tank support base 19 can be mounted on the revolving frame 5.

The space portion 23 is provided as a utility room between the hydraulic oil tank attachment site 9B and the hydraulic oil tank attachment site 10B, and the bottom surface portion 17E of the hydraulic oil tank 17. The space portion 23 is closed on the front side by the wall panel 18B of the tank support base 18, closed on the rear side by the wall panel 19B of the tank support base 19, and closed on the left side by the depth plate 20. Also, the space portion 23 is closed on the upper side by the bottom surface portion 17E of the hydraulic oil tank 17, and closed on the lower side by a below-described tool receiver 24. As a result, in the space portion 23, the opening 23A is located on an outer side in the right-and-left direction of the upper revolving structure 3 opposite to the center frame 6 of the revolving frame 5, or on the right side thereof.

Herein, the space portion 23 (opening 23A) is sized in a dimension such that other pipe body (not shown) can be connected to the supply pipe 17J of the hydraulic oil tank 17, and the tool receiver 24 and tools can be taken in or out of the space portion. Furthermore, the space portion 23 (opening 23A) is sized in a dimension such that drainage work can manually be performed through the discharge pipe 17K from the opening 23A. Specifically, the opening 23A is formed in a rectangular shape extending in a front-and-rear direction surrounded by the right side frame 8 of the revolving frame 5, the counterweight 11, the hydraulic oil tank 17 and a right front cover 25A.

As shown in FIGS. 5 and 6, the tool receiver 24 is accommodated in the space portion 23 to receive the tools. As one example, the tool receiver 24 can accommodate consumables such as a bucket tooth andmaintenance tools such as a grease gun (each not shown). In addition, the consumables such as a bucket toe and maintenance tools such as a grease gun can be taken out of the opening 23A.

The tool receiver 24 is formed as, for example, a rectangular shallow container (tray). The tool receiver 24 is disposed on an upper side of the hydraulic oil tank attachment site 9B of the right front extension beam 9 and the hydraulic oil tank attachment site 10B of the right rear extension beam 10, for example, on an upper side of the lower mounting plate 18A of the tank support base 18 and the lower mounting plate 19A of the tank support base 19. In this case, the tool receiver 24 may merely be placed so as to avoid dislocation, and may be configured to be mounted removably using bolts and winged screws.

Furthermore, the tool receiver 24 can be employed as a pan discharging through the discharge pipe 17K waste liquids which deposit inside the hydraulic oil tank 17. As a result, the waste liquids can be received by the tool receiver 24 without any discharge loss when the waste liquids which deposit in the hydraulic oil tank 17 are discharged. The tool receiver 24 which has received the waste liquids can be taken out of the space portion 23 through the opening 23A.

Figure 2:
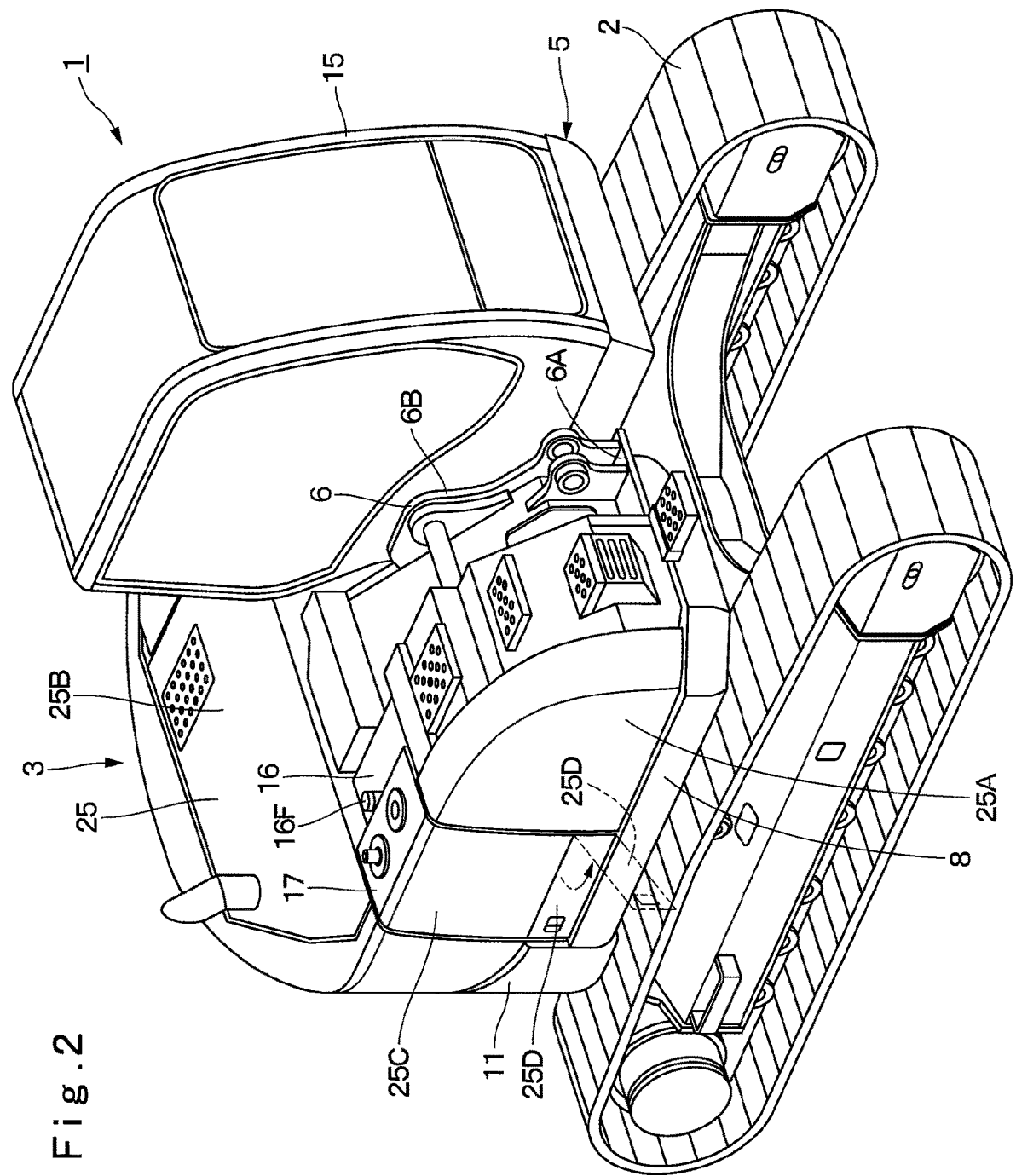
FIG. 2 is an enlarged perspective view of the hydraulic excavator without a front device.

As shown in FIGS. 1 and 2, the exterior cover 25 covers onboard equipment mounted on the revolving frame 5. The exterior cover 25 is configured to include the right front cover 25A located on a right front side opposite to the cab 15 in the right-and-left direction, an engine cover 25B located between the cab 15 and the counterweight 11 and covering an upper side of the engine 12 or the like, a tank cover 25C covering the right side of the hydraulic oil tank 17, and an opening/closing cover 25D located on a lower side of the tank cover 25C and covering the opening 23A of the space portion 23.

The opening/closing cover 25D is provided at the opening 23A of the space portion 23 to openably close the opening 23A. The opening/closing cover 25D is formed as a rectangular plate body closing the opening 23A so as to correspond to the rectangular opening 23A extending in a front-and-rear direction. Also, in the opening/closing cover 25D, for example, a front end portion thereof is mounted rotatably on a rear end portion of the right front cover 25A horizontally. Meanwhile, a rear portion of the opening/closing cover 25D can engage, disengage and lock with structures such as the right side frame 8, the counterweight 11, and the hydraulic oil tank 17. The opening/closing cover 25D may be configured to rotatably mount a rear end portion or a lower end portion.

The hydraulic excavator 1 of this embodiment is configured as described above, and subsequently, the operation of the hydraulic excavator 1 will be described.

An operator seated in the cab 15 starts the engine 12 to drive the hydraulic pump 14. As a result, pressurized oil running from the hydraulic pump 14 is supplied to actuators via the control valve. Therefore, an operator can advance or retreat the lower traveling structure 2 when operating the traveling control lever. Meanwhile, the operator can perform excavating work of earth and sand after operating the front device 4 by operating the working control lever.

Herein, waste liquids, including each type of wear debris generated by sliding, degraded hydraulic oil, and moisture caused by dew condensation, deposit at the bottom surface portion 17E while hydraulic oil circulates through the hydraulic pump 14, the control valve, and each of the actuators in the hydraulic oil tank 17. As a result, one example of work of removing waste liquids in the hydraulic oil tank 17 will be described.

The waste liquids are discharged by opening the opening/closing cover 25D of the exterior cover 25 and opening the opening 23A of the space portion 23. In this state, a plug (not shown) closing the discharge pipe 17K of the hydraulic oil tank 17 is manually removed at the space portion 23 using a tool such as a spanner. As a result, the waste liquids in the hydraulic oil tank 17 are discharged from the discharge pipe 17K to the tool receiver 24. The plug is mounted on the discharge pipe 17K to close it after discharging the waste liquids in the hydraulic oil tank 17. Also, the tool receiver 24 which has received the waste liquids can be taken out of the space portion 23 through the opening 23A, and the waste liquids can readily be discarded into a predetermined waste liquid container.

Therefore, according to this embodiment, the hydraulic oil tank attachment site 9B of the right front extension beam 9 forming the revolving frame 5 is provided with the tank support base 18 supporting the hydraulic oil tank 17 at a position at which the bottom surface portion 17E of the hydraulic oil tank 17 is separated upward from the hydraulic oil tank attachment site 9B. Also, the hydraulic oil tank attachment site 10B of the right rear extension beam 10 forming the revolving frame 5 is provided with the tank support base 19 supporting the hydraulic oil tank 17 at a position at which the bottom surface portion 17E of the hydraulic oil tank 17 is upward separated from the hydraulic oil tank attachment site 10B. The hydraulic oil tank 17 is supported by the tank support base 18 and the tank support base 19 at a position higher than that of the upper surface 8A of the right side frame 8. Also, the space portion 23 with an opening 23A corresponding to an outer side in the right-and-left direction of the upper revolving structure 3 is provided between the hydraulic oil tank attachment site 9B and the hydraulic oil tank attachment site 10B, and the bottom surface portion 17E of the hydraulic oil tank 17. In addition, the opening 23A of the space portion 23 is provided with an opening/closing cover 25D openably closing the opening 23A.

Therefore, the space portion 23 provided using a space between the revolving frame 5 and the hydraulic oil tank 17 can be employed as a utility room. That is, the space portion 23 can accommodate consumables such as a bucket toe and maintenance tools such as a grease gun. In addition, the consumables such as a bucket toe and maintenance tools such as a grease gun can be taken in and out of the space portion 23 through the opening 23A outside thereof.

Consequently, each maintenance operation can readily be performed to improve the operational efficiency. Particularly, even the small-revolving type hydraulic excavator 1 having a small installation space of the upper revolving structure 3 can be provided with a utility room.

In addition, the opening 23A of the space portion 23, which can openably be closed by the opening/closing cover 25D, can thus prevent theft of consumables such as a bucket toe and maintenance tools such as a grease gun andmisbehavior. Also, appearance aesthetics can be improved.

The tool receiver 24 is accommodated in the space portion 23. Therefore, the tool receiver 24 can accommodate consumables such as a bucket toe and maintenance tools such as a grease gun. Also, the tool receiver 24 can be employed as a pan discharging waste liquids that deposit inside the hydraulic oil tank 17 from the discharge pipe 17K. As a result, the waste liquids discharged from the hydraulic oil tank 17 can be received by the tool receiver 24 without any discharge loss to keep the working environment favorable.

The tank support base 18 and the tank support base 19 are formed as a partition plate surrounding the periphery of the space portion 23 other than the opening 23A. Specifically, the space portion 23 can be surrounded by the wall panel 18B of the tank support base 18, the wall panel 19B of the tank support base 19 and the depth plate 20 to stably accommodate consumables such as abucket toe and maintenance tools such as a grease gun. In addition, the depth plate 20 can prevent tools accommodated in the tool receiver 24, even when randomly moving from the vibration while traveling and operating, from hitting the right surface portion 16D of the fuel tank 16.

One embodiment of the present invention exemplifies a case where a hydraulic oil tank 17 is employed as an oil reservoir tank to provide a space portion 23 between the hydraulic oil tank 17 and a revolving frame 5. However, the present invention is not limited to that, and a fuel tank may be used as an oil reservoir tank, and may be configured to include a space portion provided between the fuel tank and a revolving frame.

One embodiment of the present invention exemplifies a configuration where an upper revolving structure 3 is provided on the right side in the right-and-left direction with a hydraulic oil tank attachment site 9B of a right front extension beam 9, a hydraulic oil tank attachment site 10B of a right rear extension beam 10, a hydraulic oil tank 17, a tank support base 18, a tank support base 19, a space portion 23, and anopening/closing cover 25D. Nevertheless, the present invention is not limited to that, and the upper revolving structure may be provided on the left side in the right-and-left direction with a hydraulic oil tank attachment site of an extension beam, a hydraulic oil tank, a tank support base, a space portion, and an opening/closing cover.

Moreover, one embodiment of the present invention illustrates a hydraulic excavator 1 with a crawler-type lower traveling structure 2 as a construction machine. However, the present invention is not limited to that, and may be employed in, for example, a hydraulic excavator with a wheel-type lower traveling structure. In addition, the present invention can widely be employed in other construction machines such as a hydraulic crane.

DESCRIPTION OF REFERENCE NUMERALS

1: Hydraulic excavator (Construction machine)
2: Lower traveling structure (Vehicle body)
3: Upper revolving structure (Vehicle body)
5: Revolving frame (Vehicle body frame)
6: Center frame
7: Left side frame
8: Right side frame
9: Right front extension beam
9B, 10B: Hydraulic oil tank attachment site (Tank attachment site)
10: Right rear extension beam
16: Fuel tank (Oil reservoir tank)
17: Hydraulic oil tank (Oil reservoir tank)
17E: Bottom surface portion
18, 19: Tank support base
18B, 19B: Wall panel (Partition plate)
20: Depth plate (Partition plate)
23: Space portion
23A: Opening
24: Tool receiver
25: Exterior cover
25D: Opening/closing cover

The invention claimed is:

1. A construction machine comprising:
a vehicle body;
a vehicle body frame including a center frame disposed in the center in the right-and-left direction of said vehicle body, a left side frame provided on the left side of said center frame and extending in a front-and-rear direction of said vehicle body, and a right side frame provided on the right side of said center frame and extending in the front-and-rear direction of said vehicle body;
a tank attachment site located and provided on the right side or the left side of said vehicle body frame; and
an oil reservoir tank storing oil liquids provided at said tank attachment site, wherein
said tank attachment site is provided with a pair of tank support bases supporting said oil reservoir tank at a position at which a bottom surface portion of said oil reservoir tank is separated upward from said tank attachment site, said pair of tank support bases are disposed separately in the front-and-rear direction of said vehicle body, said oil reservoir tank is supported by said pair of tank support bases at a position higher than that of an upper surface of either said left side frame or said right side frame, a space portion with an opening corresponding to an outer side in the right-and-left direction of said vehicle body opposite to said center frame is provided between said tank attachment site and said bottom surface portion of said oil reservoir tank, a tool receiver is accommodated in said space portion, the opening of said space portion is provided with an opening/closing cover openably closing said opening, a supply pipe supplying oil liquid and a discharge pipe discharging oil liquid are provided at said bottom surface portion of said oil reservoir tank, said oil reservoir tank is supported on said pair of tank support bases such that said supply pipe and said discharge pipe are accommodated in said space portion, and said pair of tank support bases is set in a dimension so as to allow drainage work performed through said discharge pipe, and said tool receiver and tools to be taken in and out of the space mounted on said tool receiver.

2. The construction machine according to claim 1, wherein said pair of tank support bases is formed as a partition plate surrounding the periphery of said space portion other than said opening.

3. The construction machine according to claim 1, further comprising:

a right front extension beam and a right rear extension beam supporting said right side frame on said center frame, and disposed at an interval in a front-and-rear direction of said center frame, wherein said oil reservoir tank is a hydraulic oil tank which reserves hydraulic oil, said tank attachment site is a hydraulic oil tank attachment site which is provided on each of an upper surface of said right front extension beam and an upper surface of said right rear extension beam, said upper surface of said right front extension beam provided with said hydraulic oil tank attachment site and said upper surface of said right rear extension beam provided with said hydraulic oil tank attachment site are set to height dimensions equivalent to that of said upper surface of said right side frame, said tank support bases are each provided with said hydraulic oil tank attachment site of said right front extension beam and said hydraulic oil tank attachment site of said right rear extension beam, said tool receiver is accommodated removably on an upper side of said hydraulic oil tank attachment site of said right front extension beam and an upper side of said hydraulic oil tank attachment site of said right rear extension beam, and in a state in which said tool receiver is accommodated in said space portion, a bottom side of said space portion is closed by said tool receiver.

* * * * *